United States Patent [19]

Riley et al.

[11] Patent Number: 5,188,400
[45] Date of Patent: Feb. 23, 1993

[54] SPRING LOADED COUPLING WITH POSITIVE SPRING LATCH

[75] Inventors: John J. Riley, Denver; Jerome E. Opila, Littleton, both of Colo.

[73] Assignee: Stanley Aviation Corporation, Aurora, Colo.

[21] Appl. No.: 761,271

[22] Filed: Sep. 17, 1991

[51] Int. Cl.⁵ .......................................... F16L 27/113
[52] U.S. Cl. .................................... 285/233; 285/265; 285/415; 285/419; 285/921; 24/19; 24/270
[58] Field of Search ................. 24/19, 270, 273, 16 R, 24/69 R, 69 ST; 285/365, 373, 407, 415, 419, 319, 921, 233

[56] References Cited

U.S. PATENT DOCUMENTS

| | | |
|---|---|---|
| 1,428,560 | 9/1922 | Robinson ............................. 24/273 |
| 2,673,102 | 3/1954 | Hutchinson . |
| 2,869,211 | 1/1959 | Kessler et al. . |
| 3,336,643 | 8/1967 | Robison . |
| 3,776,579 | 12/1973 | Gale ..................................... 255/233 |
| 3,999,825 | 12/1976 | Cannon . |
| 4,008,937 | 2/1977 | Filippi . |
| 4,249,786 | 2/1981 | Mahoff . |
| 4,480,359 | 11/1984 | Koster ................................... 24/270 |
| 4,573,717 | 3/1986 | Peacock . |
| 4,621,820 | 11/1986 | Foster ............................ 285/233 X |
| 4,843,686 | 7/1989 | Bartholomew ......................... 24/19 |
| 4,881,760 | 11/1989 | Runkles et al. . |
| 4,900,070 | 2/1990 | Runkles et al. . |
| 4,905,950 | 3/1990 | Turner et al. ......................... 24/273 |

FOREIGN PATENT DOCUMENTS 1427582 3/1976 United Kingdom ............. 24/69 ST

Primary Examiner—Randolph A. Reese
Assistant Examiner—Heather Chun
Attorney, Agent, or Firm—Fields, Lewis, Pittenger & Rost

[57] ABSTRACT

A spring-loaded coupling device for releasably interconnecting confronting ends of first and second fluid carrying conduits is provided. A pair of symmetrical arcuate coupling halves are pivotally jointed together at first adjacent ends for circumferentially surrounding the conduit ends. A latch is mounted adjacent the opposite end of one of the halves. This latch includes a flange having a slot opening outwardly and an outwardly extending flat spring lock terminating in an end surface. A toggle is provided which has a first end pivotally mounted adjacent the opposite end of the other of the halves, and has a second end extendable longitudinally beyond the opposite end of the first of the halves. The toggle includes a locking pin adjacent the second end of the toggle and engageable with the slot when the coupling halves are closed around the sleeve and has a spring urging the toggle to pivot in a direction to move the locking pin into the slot. A cam is provided for rotating the toggle against the force of the leaf spring as the coupling halves are closed to cause the locking pin to clear the flange and drop into the slot to form a primary lock. An aperture adjacent the second end of the toggle receives the spring lock which snaps into locked position to form a secondary lock. The coupling may have spherical shoulders to reduce localized stresses and forces.

9 Claims, 3 Drawing Sheets

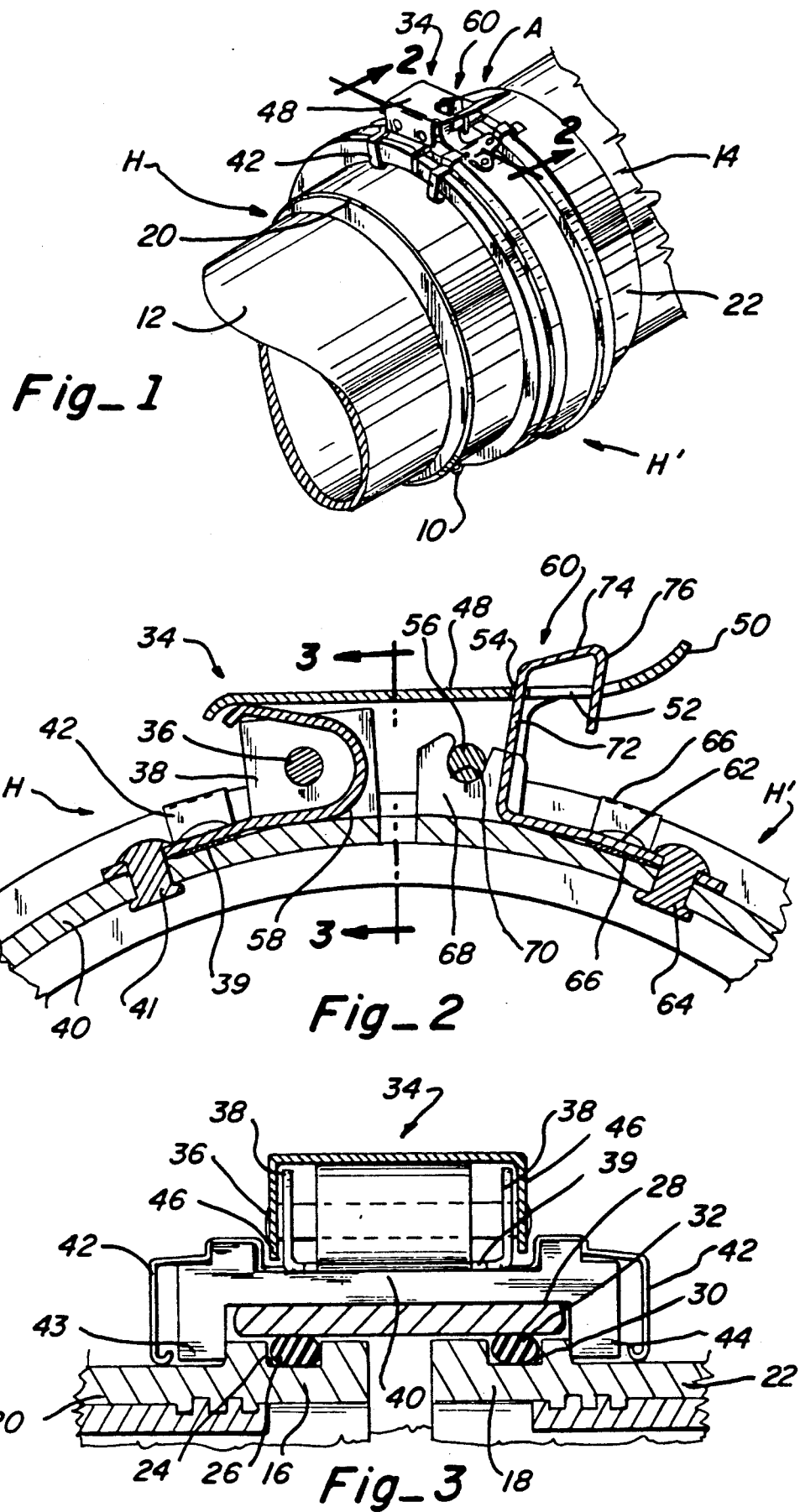

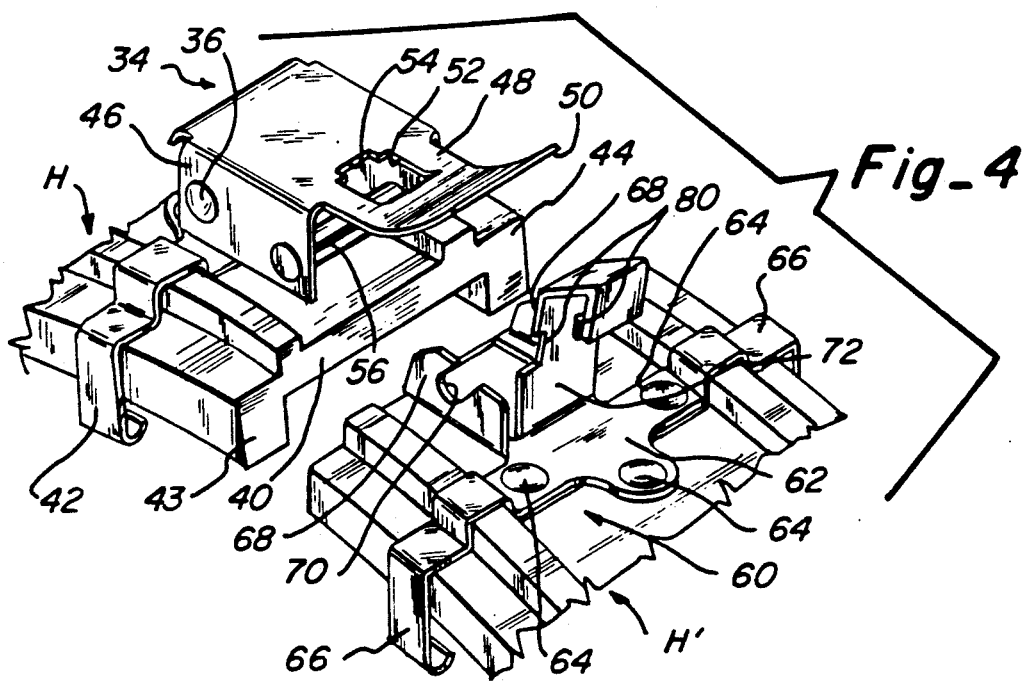
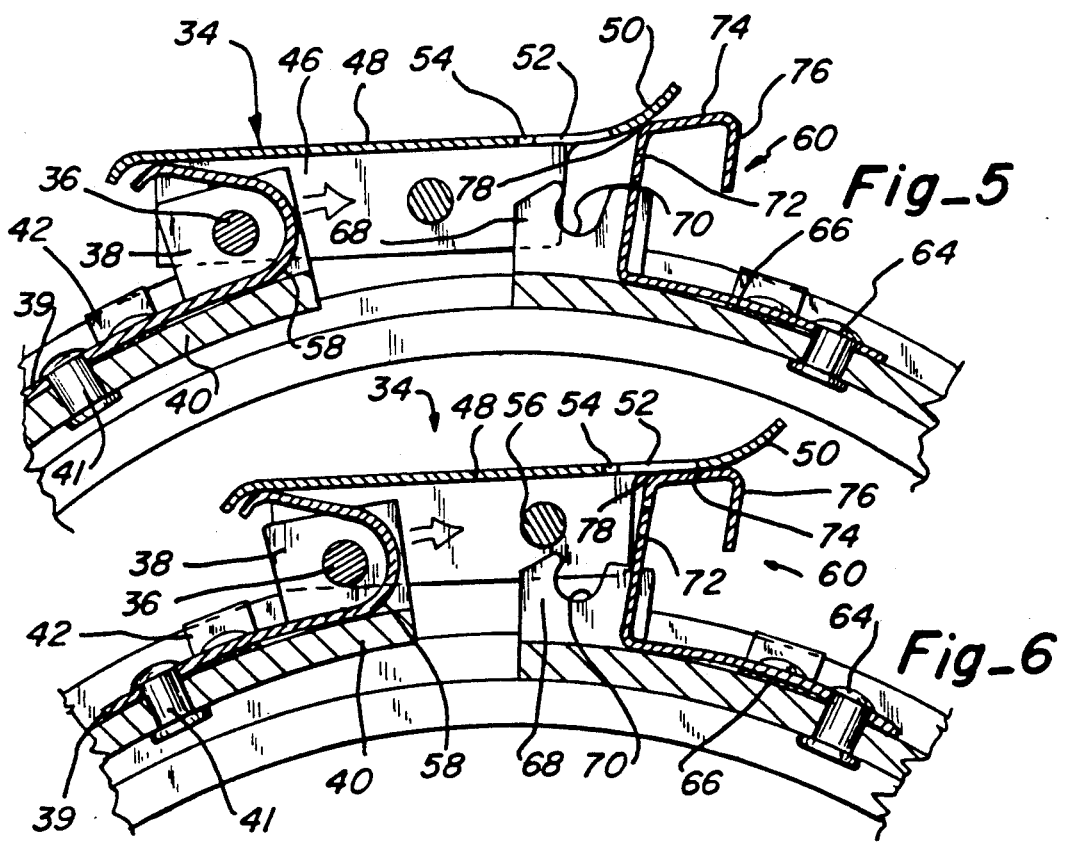

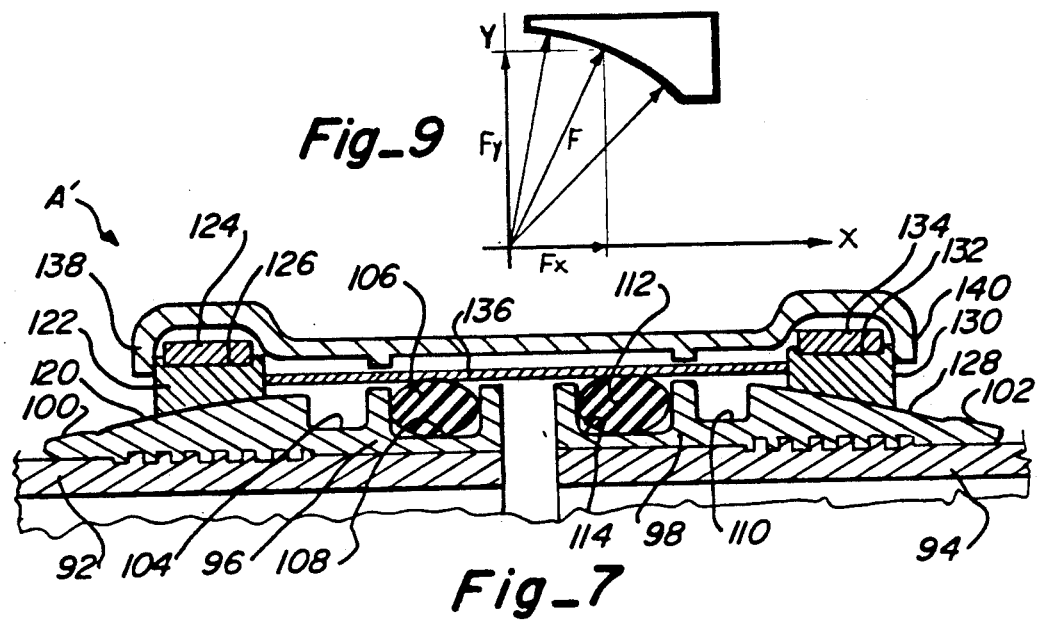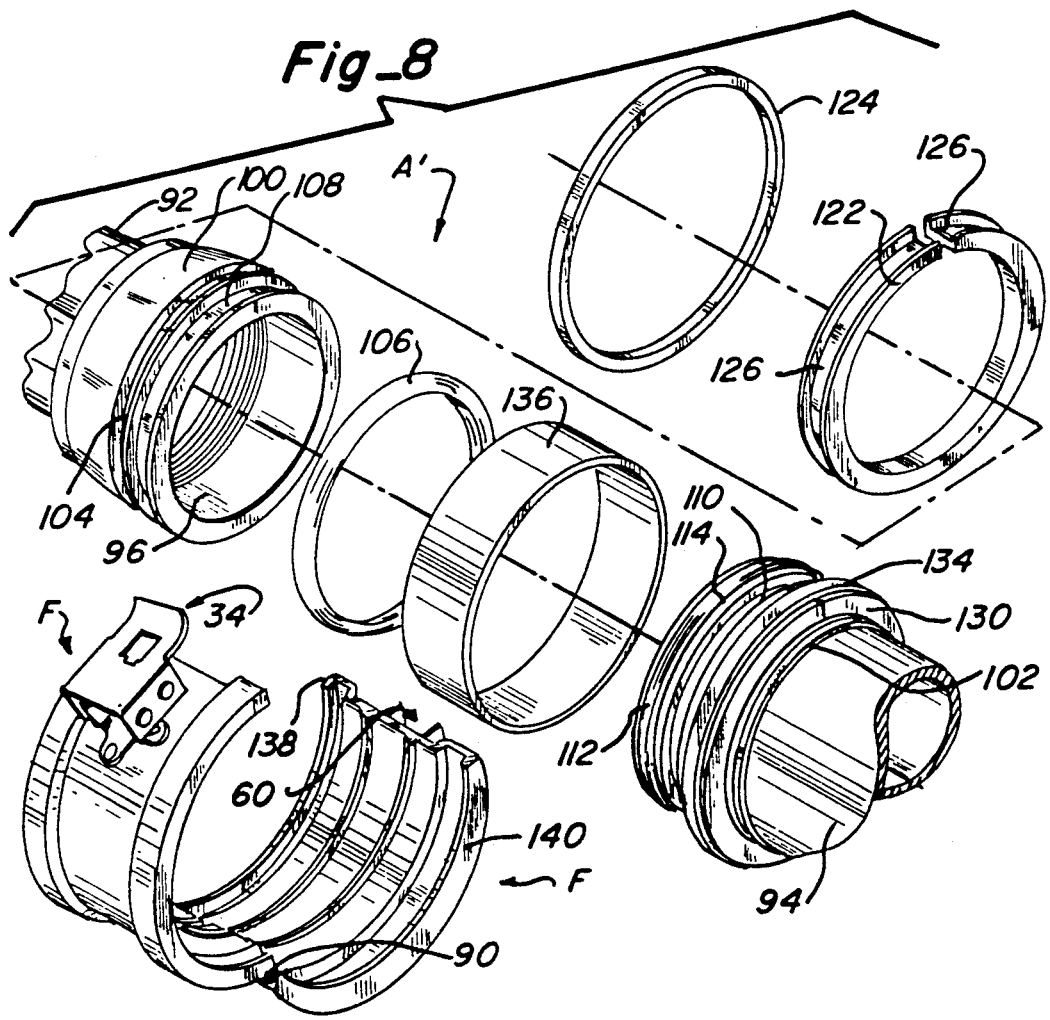

SPRING LOADED COUPLING WITH POSITIVE SPRING LATCH

TECHNICAL FIELD

This invention relates to a coupling assembly for interconnecting a pair of tubular conduit members, and more particularly to such a coupling assembly having a releasable locking member that can be closed and opened with one hand and which has primary and secondary redundant locking features. The coupling may have spherical shoulders to reduce localized stresses.

BACKGROUND ART

Because of the space confinements within an aircraft, coupling assemblies for interconnecting tubular conduit members are often located at places within the aircraft which are difficult to reach, to see and to service. Thus, it is desirable to have couplings which can be easily manipulated with one hand by the mechanic for closure while having redundant locking features. Also, if the coupling needs to removed or replaced, it should be possible for the mechanic to manipulate the release of the redundant locking features with one hand.

Numerous couplings have been devised which are intended to be manipulated with one hand. However, none of these provide the simple and cost efficient locking device with redundant features as is found in the present invention. Prior art devices which are deemed relevant to the present invention are described below.

Although couplings with spherical shoulders are known to produce less localized stresses and unwanted forces, they produce such great hoop stresses that they cannot be used in split clam-shell couplings with conventional hinges and latches.

U.S. Pat. No. 3,336,643 to Robinson discloses an adjustable wire fabric weapon securing apparatus in which a buckle pin fits into a curved area at the base of hooks. A toggle mechanism keeps the buckle pin in engagement with the hooks.

U.S. Pat. No. 3,999,825 to Cannon shows an overcenter latch.

U.S. Pat. No. 4,008,937 to Flippi discloses a coupling assembly for coupling two tubular fluid conveying members together. It has a safety lock comprised of a locking clip which is positionable to cooperate with the catch defined by an enlarged lever end to latch the lever in its clamping position.

U.S. Pat. No. 4,249,786 to Mahoff shows a coupling having a plurality of oppositely extending latches which are spring-loaded at their hinges so as to be brought into latching engagement with latch pins upon squeezing the two sections of the coupling together.

U.S. Pat. No. 4,881,760 to Runkles et al. shows a conduit coupling with redundancy features. A locking mechanism includes locking edges which engage locking lips on a latch member. A similar device is shown in U.S. Pat. No. 4,900,070 to Runkles et al.

Other types of toggle connections are shown in U.S. Pat. No. 2,673,102 to Hutchinson; U.S. Pat. No. 2,869,211 to Kessler et al.; and U.S. Pat. No. 4,573,717 to Peacock.

Although each coupling described is suitable for its intended purpose, none can be operated with one hand and provided locking redundancy with a primary lock and a secondary lock.

DISCLOSURE OF THE INVENTION

In accordance with this invention a spring-loaded coupling device for releasably interconnecting confronting ends of first and second fluid carrying conduits is provided. The device includes a sleeve for circumferentially surrounding the sealing ring on the annular flanges. A pair of symmetrical arcuate coupling halves are pivotally jointed together at first adjacent ends for circumferentially surrounding the sleeve, each of the coupling halves including an arcuate circumferential wall having an outer surface and a pair of spaced ribs extending inwardly from opposite circumferential edges of the outer surface for engaging the outside of the flanges. A latch is mounted on the outer surface of the wall adjacent the opposite end of one of the halves. This latch includes a flange having a slot opening outwardly and an outwardly extending flat spring lock terminating in an end surface. A toggle is provided which has a first end pivotally mounted on the outer surface of the wall adjacent the opposite end of the other of the halves, and has a second end extendable longitudinally beyond the opposite end of the first of the halves. The toggle includes a locking pin adjacent the second end thereof and engagable with the slot when the coupling halves are closed around the sleeve. The toggle also includes a leaf spring which urges the toggle to pivot in a direction to move the locking pin into the slot. A cam is provided on one of the latch and the toggle for rotating the toggle against the force of the leaf spring as the coupling halves are closed to cause the locking pin to clear the flange and drop into the slot to form a primary lock as the coupling halves are closed around the sleeve.

In addition, an aperture can be provided adjacent the second end of the toggle for receiving the flat spring lock and having a notch into which the spring lock snaps under the spring force to hold the spring lock in locked position to form a secondary lock.

An end extends outwardly at an angle from the second end of the toggle and engages the flat spring lock end surface to pivot the toggle against the force of the leaf spring. The end surface can include a U-shaped portion having a first corner edge engagable with the ramp to pivot the toggle against the force of the toggle spring as the halves are closed. A flat ramp extends outwardly at substantially the same angle as the toggle when the end of the toggle clears the corner edge during closure to hold the toggle in raised position while the locking pin clears the flange. A leg depends from the other end of the ramp, the ramp being sized to pass through the aperture as the halves come together. The aperture has a recess into which the flat spring lock is urged to form a secondary lock to prevent release of the toggle after the halves are closed.

The coupling can be released by grasping the end of the toggle and the depending end of the spring lock and squeezing them toward each other, both the secondary lock and primary locks are released whereupon the ramp is forced by the corner under the influence of the leaf spring so that the toggle forces the ends of the halves apart.

In accordance with another aspect of the invention, a method is provided which includes the steps of squeezing the second ends of the halves together while pivoting the toggle in one direction to raise the locking pin above the latch plate, pivoting the toggle in the opposite direction to lower the locking pin into a recess to create a primary lock and interconnect the second ends and engaging the spring lock with the toggle to form a secondary lock. The method can also include the further steps of disengaging the spring latch from the toggle, pivoting the toggle in the one direction and separating the second ends from each other.

In a further embodiment of the invention, the annular flanges are provided with outer spherical shoulders spaced from the sealing ring. A spherical split ring extends around each of the spherical shoulders and an annular collar extends around each of the spherical split rings. The spaced ribs of each coupling half extend beyond the ends of the collar and engage the outside edge of the spherical split rings. Conveniently, the arcuate circumferential walls of the coupling halves have a recess adjacent the rib to hold and position the annular collar over the spherical split ring. This arrangement reduces localized stresses and forces.

The advantage of the present invention is that a coupling can be closed and provides redundant locking features wherein a primary lock is secured by the movement of a locking pin into a recess and a secondary lock is secured by a spring latch which holds the toggle carrying the locking pin in a predetermined, fixed position. The primary and secondary locks are moved into locking position by the springs which are part of the coupling device. Thus, no locking manipulation is required by the mechanic other than to squeeze the coupling halves together. To unlock the coupling halves, the operator need merely to squeeze the ends of the toggle and secondary spring latch toward each other whereupon the springs which form a part of the coupling device will cause the ends of the coupling halves to be separated.

In addition, in one embodiment a coupling has been provided which utilizes spherical shoulders to produce less localized stresses and forces but overcomes the undesirable hoop stresses normally associated with spherical shoulders, allowing the use of a split cam-shell coupling with conventional hinges and latches.

Additional advantages of this invention will become apparent from the description which follows, taken in conjunction with the accompanying drawings.

BRIEF DESCRIPTION OF THE DRAWINGS

FIG. 1 is a perspective view of the coupling of this invention;

FIG. 2 is a greatly enlarged, horizontal section, taken along line 2—2 of FIG. 1, showing details of the latch mechanism for the coupling;

FIG. 3 is a vertical section, taken along line 3—3 of FIG. 2, showing further details of the coupling;

FIG. 4 is a fragmentary perspective view showing the coupling in unlocked position;

FIG. 5 is a horizontal section, similar to FIG. 2, but showing the manner in which the toggle is pivoted during closure;

FIG. 6 is a horizontal section, similar to FIG. 2 and 5, showing the coupling as it is brought more closely into locked position;

FIG. 7 is an enlarged horizontal section through an alternative coupling having spherical shoulders;

FIG. 8 is an exploded view of the coupling of FIG. 7; and

FIG. 9 is a diagram of the forces exerted in the spherical shoulder construction.

BEST MODE FOR CARRYING OUT THE INVENTION

In accordance with this invention, a coupling assembly A is provided which comprises a first coupling half H and a second coupling half H' having first ends pivotally connected together by pivot pin or hinge 10. Referring to FIGS. 1 and 3, the coupling assembly A interconnects a pair of fluid carrying tubes or conduits 12 and 14. Sealing flanges 16 and 18 are connected to conduits 12 and 14 by skirts 20 and 22, respectively. As best seen in FIG. 3, sealing flange 16 is provided with a recess 24 for receiving a sealing ring 26 which bears against a coupling sleeve 28 to form a seal. Similarly, sealing flange 18 is provided with a recess 30 for receiving a sealing ring 32 which bears against coupling sleeve 28.

The ends of coupling halves H and H' opposite hinge 10 have cooperating latch means. On the end of half H opposite hinge 10 is mounted a toggle 34 about a pivot pin 36. The pivot pin extending laterally through the toggle and is journaled in upturned flanges 38 on opposite sides of bracket 39 attached to arcuate circumferential wall 40 of half H. Conveniently, bracket 39 is held in place, as by rivets 41, which extend through a bonding jumper 42 provided thereunder. As best seen in FIG. 3, wall 30 has ribs 43 and 44 on opposite edges extending inwardly from engaging flanges 16 and 18, respectively. Toggle 34 has downwardly depending flanges 46 for receiving the ends of pin 36 and a forwardly extending arm 48 which terminates in an upturned portion 50. Arm 48 also includes an aperture 52 having a wider forward portion and a narrower locking recess 54, as best seen in FIG. 4. Also, a locking pin 56 is connected between depending flanges 46. Conveniently, a latch spring 58 urges toggle 34 in a clockwise direction as viewed in FIGS. 2, and 4–6.

On the end of half of H' opposite hinge 10 a locking bracket 60 is provided which includes a base 62 secured to half H', as by rivets 64 which extend through the base and through bonding jumper 66. Conveniently, locking bracket 60 includes a pair of laterally spaced upstanding flanges 68, each having a recess 70.

Locking bracket 60 also includes a spring locking arm 72 extending upwardly and then is bent angularly to form a ramp 74 extending in an oblique angle from locking spring 72 and terminating in a downturned end 76. The angle between locking spring 72 and ramp 74 forms a sharp edge 78 along which end 50 rides as the halves are squeezed together, as in FIG. 5. Thus, edge 78 provides a low friction contact with end 50 and also serves to cam toggle 34 in a counter clockwise direction about pivot 36 to raise it so that locking pin 56 will clear flanges 68 on locking bracket 60.

After the toggle 34 is raised, arm 48 thereof will be at the same angle as ramp 74, as shown in FIG. 6. Arm 48 will continue to move along ramp 74 until ramp 74 is aligned with aperture 52 which is of sufficient size to allow the toggle to pivot clockwise under the influence of leaf spring 58, thereby dropping locking pin 56 into recess 70 in flanges 68 to provide a primary lock. Locking spring 72 has notches 80 on opposite edges which snap into and engage recess 54 and are held there by the force of locking spring 72 to provide a secondary lock. Thus, the coupling halves H and H' can be squeezed by the mechanic with one hand causing the latch to be locked with both the primary lock and secondary lock so that there is the required redundant locking feature required in aircraft usage.

The coupling can also be opened with one hand. To accomplish this, the mechanic merely grasps the end 50 of toggle 34 and end 76 of locking spring 72 between the thumb and index finger and squeezes the two together. This motion moves locking spring 70 in a clockwise direction so that notches 80 are disengaged from the edges of recess 54 to disengage the secondary lock. This movement also raises arm 48 of toggle 34 over the ramp. Upon release by the mechanic, the leaf spring 58 tends to move the toggle in a clockwise direction against ramp 74. This action then will cause end 50 to move downwardly along ramp 74 thereby urging halves H and H' apart. Also, when toggle arm 48 is raised, locking pin 56 is raised out of recesses 70 to release the primary lock so that the locking pin clears flanges 68 as the coupling halves H and H' are forced apart.

From the foregoing, the advantages of this form of the invention are readily apparent. A coupling assembly A has been provided wherein coupling halves H and H' can be secured together by squeezing with one hand by the mechanic. Upon squeezing the halves together, end 50 of arm 48 rides along edge 78 of locking spring 72 thereby raising the toggle so that the arm thereof slides along ramp 74 so that locking pin 56 clears flanges 68. When the halves are brought closely together, the ramp 74 is aligned with recess 52 so as the toggle can be moved downwardly by the action of leaf spring 58 bringing locking pin 56 into engagement with recesses 70 forming a primary lock. Locking spring 72 is urged in a counter clockwise direction bringing notches in the edges thereof into recess 54 providing a secondary lock which resists any upward movement of arm 48. When the coupling assembly A is to be released, the mechanic merely grasps end 50 and ramp 74 between his thumb and index finger and squeezes them together thereby releasing locking spring 72 from recess 54 and forcing toggle 34 up over ramp 74. The action between ramp 74 and end 50 due to the force exerted by leaf spring 58 force the lock portions and halves H and H' apart, thereby releasing the coupling.

In an alternative embodiment shown in FIGS. 7 and 8, a first coupling half F and a second coupling half F' have first ends pivotally connected together as by pivot pin or hinge 90. This coupling assembly A' interconnects a pair of fluid carrying tubes or conduits 92 and 94. Sealing flanges 96 and 98 are connected to conduits 92 and 94 by skirts 100 and 102, respectively. Conveniently, sealing flange 96 has an outer recess 104 for receiving a sealing ring and an inner recess 108 for reducing the weight of the flange. Similarly, sealing flange 98 is provided with an outer recess 110 for receiving a sealing ring 112 and an inner recess 114 for weight reduction.

Advantageously, sealing flange 96 is provided with a curved shoulder 120 which terminates at skirt 100 and bears against a correspondingly shaped inner surface of split ring 122. This split ring may be made of aluminum to hold the split ring together and to resist the hoop stresses created when the coupling is under load. A steel ring 124 is provided which is received in groove 126 in the outer surface of the split ring halves.

Similarly, sealing flange 98 has a curved shoulder 128 extending from recess 112 to skirt 102. A split ring 130, which has an interior surface which corresponds to the slope of shoulder 128 and may be made of aluminum, extends around shoulder 128 and has a groove 132 in the outer surface thereof for receiving steel back-up ring 134. A coupling sleeve 136 extends across the flanges and provides a bearing surface for sealing rings 108 and 114. Conveniently, the coupling halves each having depending outer flanges 138 and 140 which engage the outer edges of split rings 122 and 130, respectively, to hold them in position against shoulders 120 and 128, respectively.

Assembly of this coupling is accomplished by spreading spherical split ring 122 apart and sliding it over and past flange end 96 to a position over skirt 100 and squeezing the split gap closed. Then steel back-up ring 124 is slid over flange end 96 and positioned in groove 126 to hold the split ring together. Then the split ring and the back-up ring are slid forward as a unit into engagement with spherical shoulder 120. Similarly, split ring 130 is separated and slid over flange 98 past spherical shoulder 128 to a position over skirt 128 and squeezed back together. Next, back-up ring 134 is slid over the flange and positioned in groove 132 of the back-up ring. The split ring 130 along with back-up ring 134 are slid forwardly as a unit against spherical shoulder 128. Sleeve 136 is then installed over both flange ends and then the halves F and F' of assembly A' are closed over the coupling so that flanges 138 and 140 engage the outer edges of split rings 122 and 130, respectively, to hold them in position against the spherical surfaces 120 and 128, respectively.

When pressure is applied to the coupling, the spherical surface sees a pressure load which is perpendicular to its surface, as shown in FIG. 9. With respect to force F, the component $F_x$ is the pressure plug load and the component force $F_y$ is the hoop load. Typically, as shown in FIG. 9, the hoop load is several times greater than the plug load. Thus, steel rings 124 and 134 resist these hoop loads so that a coupling assembly having conventional hinges and latches can be utilized.

This invention has been described in detail with reference to particular embodiments thereof, but it will be understood that various other modifications can be effected within the spirit and scope of this invention.

We claim:

1. A spring loaded coupling device for releasably interconnecting confronting ends of first and second fluid carrying conduits wherein an annular flange is attached to each of the confronting ends, each flange having a sealing ring extending therearound said device comprising:

a sleeve for circumferentially surrounding the sealing rings and the flanges;

a pair of symmetrical arcuate coupling halves pivotally joined together at first adjacent ends for circumferentially surrounding said sleeve, each of said coupling halves including an arcuate circumferential wall having an outer surface and a pair of spaced ribs extending inwardly from opposite circumferential edges of said outer surface for engaging the outside of said flanges;

a latch mounted on said outer surface of said wall adjacent said opposite end of one of said halves, said latch including a flange having a slot opening outwardly and an outwardly extending flat spring lock terminating in an end surface;

a toggle having a first end pivotally mounted on said outer surface of said wall adjacent said opposite end of the other of said halves and having a second end extendable longitudinally beyond said opposite end of said other of said halves, said toggle includes a locking pin adjacent said second end of said toggle engagable with said slot, when said coupling halves are closed around said sleeve, and a toggle spring urging said toggle to pivot in a direction to move said locking pin into said recess; and cam means, on one of said latch and said toggle, for rotating said toggle against the force of said toggle spring as said coupling halves are closed to cause said locking pin to clear said flange to drop into said slot to form a primary lock as said coupling halves are closed around said sleeve.

2. Apparatus as claimed in claim 1, further including:

an aperture adjacent said second end of said toggle for receiving said flat spring lock therethrough and having a notch into which said spring lock snaps under the spring force thereof to hold said spring lock in locked position to form a secondary lock.

3. Apparatus, as claimed in claim 2, wherein in said cam means comprises:

a flat end portion extending outwardly at an angle from said second end of said toggle engagable with said flat spring lock end surface to pivot said toggle against the force of said toggle spring.

4. Apparatus, as claimed in claim 3, wherein said end surface comprises:

a U-shaped portion having a first corner edge engagable with said flat end portion to pivot said toggle against the force of said toggle spring as said halves are closed;

a flat ramp extending outwardly at substantially the same angle as said toggle, when said flat end portion clears said corner edge during closure, to hold said toggle in raised position so that said locking pin clears said flange during closure; and a leg depending from the outer end of said ramp, said ramp being sized to pass through said aperture as said halves come together to secure said secondary lock.

5. Apparatus, as claim 4, wherein:

upon squeezing said ramp and said leg toward each other both said secondary lock and said primary locks are released whereupon said flat end portion presses against said corner edge so that said toggle spring forces said opposite ends of said halves apart.

6. Apparatus, as claimed in claim 1, wherein the annular flanges have outer spherical shoulders spaced from the sealing ring, said coupling device further including:

a spherical split ring extending around each of the spherical shoulders; and an annular collar extending around each of said spherical split rings, said spaced ribs extending beyond said collars and engaging the outside of said spherical split rings to hold them against the respective spherical shoulders.

7. Apparatus, as claimed in claim 6, wherein:

said arcuate circumferential walls of said coupling halves have a recess adjacent said rib to hold and position said annular collar over said spherical split ring.

8. A method of releasably interconnecting and releasing confronting ends of first and second fluid carrying conduits wherein an annular flange is attached to each of the confronting ends and has a sealing ring therearound, a sleeve circumferentially surrounding the sealing rings and a pair of symmetrical arcuate coupling halves pivotally joined together at first adjacent ends and being closable about said sleeve and flanges to bring second ends thereof into closed locking relationship where one second end includes a pivotal toggle having an arm with an aperture therein and a locking pin and the other second end includes a latch plate with a spring lock having side notches for engaging the aperture, said method comprising the steps of:

squeezing the second ends of the halves together while pivoting the toggle in one direction to raise the locking pin above the latch plate;

pivoting the toggle in the opposite direction to lower the locking pin into the recess to create a primary lock and interconnect the second ends; and engaging the spring lock notches with the aperture in the toggle to form a secondary lock.

9. A method, as claimed in claim 8, including the further steps of:

disengaging the spring lock from the toggle;

pivoting the toggle in said one direction; and separating the second ends from each other.

* * * * *